United States Patent [19]

Bugdahl et al.

[11] 4,296,006
[45] Oct. 20, 1981

[54] BINDER FOR COATING COMPOSITIONS AND ITS USE

[75] Inventors: Volker Bugdahl; Gerhard Morlock; Werner Reidt, all of Hanau; Emil Kerschner, Rodenbach, all of Fed. Rep. of Germany

[73] Assignee: Degussa Aktiengesellschaft, Frankfurt, Fed. Rep. of Germany

[21] Appl. No.: 122,492

[22] Filed: Feb. 19, 1980

[30] Foreign Application Priority Data

Feb. 22, 1979 [DE] Fed. Rep. of Germany ....... 2906844

[51] Int. Cl.$^3$ ................................................ C09D 3/58
[52] U.S. Cl. .......................... 260/23 EP; 260/998.19; 260/23 AR; 404/17; 404/22; 427/137
[58] Field of Search ......... 260/998.19, 23 EP, 23 AR; 404/17, 22; 427/137

[56] References Cited

U.S. PATENT DOCUMENTS

| | | | |
|---|---|---|---|
| 3,107,226 | 10/1963 | Tonner et al. | 260/23 EP |
| 3,904,560 | 9/1975 | McKenzie | 260/998.19 |
| 4,203,878 | 5/1980 | Bauer | 260/998.19 |
| 4,212,776 | 7/1980 | Martinez et al. | 260/23 EP |

FOREIGN PATENT DOCUMENTS 1190746  5/1970  United Kingdom ........... 260/998.19

Primary Examiner—Ronald W. Griffin
Attorney, Agent, or Firm—Cushman, Darby & Cushman

[57] ABSTRACT

There is provided a binder for coating compositions based on a mixture of an unsaturated β-hydroxy ester with copolymerizable monomers. The binder consists essentially of, on a total weight basis, (A) 25 to 60 weight percent of an unsaturated β-hydroxy ester which is produced by reacting an epoxy resin based on bisphenol A and epichlorohydrin with a molecular weight between 800 and 3000 and an epoxide equivalent weight between 400 and 2500 with a mixture of (a) 74 to 64 mole percent of methacrylic acid and/or acrylic acid and (b) 26 to 36 mole percent of at least one saturated monocarboxylic acid having 8 to 20 carbon atoms or a mixture of at least one saturated monocarboxylic acid having 8 to 20 carbon atoms with up to 20 mole percent of an unsaturated monocarboxylic acid having 8 to 20 carbon atoms, and (B) 75 to 40 weight percent of a mixture based on the weight of component (B) of (a) 70 to 95 weight percent methyl methacrylate, (b) 30 to 5 weight percent of at least one monomer of the formula $CH_2=CR_1—COOR_2$ where $R_1$ is hydrogen or a methyl group and $R_2$ is a straight chain alkyl group with 4 to 10 carbon atoms, a branched alkyl group with 6 to 12 carbon atoms, a hydroxyalkyl group with 2 to 4 carbon atoms or a saturated hydrocarbon group interrupted by ether oxygen atoms containing 3 to 10 carbon atoms, and (c) 0 to 3 weight percent of at least one crosslinking agent for acrylate or methacrylate resins. This binder is particularly useful for making road marking compositions.

18 Claims, No Drawings

BINDER FOR COATING COMPOSITIONS AND ITS USE

BACKGROUND OF THE INVENTION

The invention is directed to a binder for coating compositions based on an unsaturated $\beta$-hydroxy ester mixed with a monomer copolymerizable therewith and its use for producing road marking compositions.

Compositions based on an unsaturated $\beta$-hydroxy ester, a so-called epoxyacrylate, mixed with copolymerizable monomers are known. They have been used previously for example in reinforced synthetic resins, adhesives, as printing inks or as screen printing oils. For use as priming agents, coating agent, impregnating agents, grouting compositions, binders for synthetic resin mortars, coating compositions or road marking compositions, however, the known epoxyacrylate resins are not suited without further modification since in the hardened state they do not posess a sufficient range of flexibility and during hardening are subject to a severe shrinkage.

SUMMARY OF THE INVENTION

The purpose of the invention is to provide a binder for coating compositions based on a mixture of an unsaturated $\beta$-hydroxy ester with copolymerizable monomers. The binder consists essentially of, on a total weight basis, (A) 25 to 60 weight percent of an unsaturated $\beta$-hydroxy ester which is produced by reacting an epoxy resin based on bisphenol A and epichlorohydrin with a molecular weight between 800 and 3000 and an epoxide equivalent weight between 400 and 2500 with a mixture of
  (a) 74 to 64 mole percent of methacrylic acid and/or acrylic acid and
  (b) 26 to 36 mole percent of at least one saturated monocarboxylic acid having 8 to 20 carbon atoms or the mixture of at least one saturated monocarboxylic acid having 8 to 20 carbon atoms with up to 20 mole percent of an unsaturated monocarboxylic acid having 8 to 20 carbon atoms, and (B) 75 to 40 weight percent of a mixture based on the weight of component (B) of
  (a) 70 to 95 weight percent methyl methacrylate,
  (b) 30 to 5 weight percent of at least one monomer of the formula $CH_2=CR_1-COOR_2$ where $R_1$ is hydrogen or a methyl group and $R_2$ is a straight chain alkyl group with 4 to 10 carbon atoms, a branched alkyl group with 6 to 12 carbon atoms, a hydroxy alkyl group with 2 to 4 carbon atoms or a saturated hydrocarbon group interrupted by ether oxygen atoms containing 3 to 10 carbon atoms, and
  (c) 0 to 3 weight percent of at least one crosslinking agent for acrylate or methacrylate resins.

The binders of the invention possess a good storage stability and by hardening produce flexible and tenacious coatings. One of their main advantages is that even in thin layers, for example, below 0.5 mm thick, without previous priming they harden safely and without tackiness. Therefore they are also suitable for coating vertical surfaces.

For the production of component (A) there is employed at least one epoxy resin based on bisphenol A (2,2'-bis-(p-hydroxyphenyl)-propane and epichlorohydrin, thus a polyglycide ether with a molecular weight between 800 and 3000 and an epoxide equivalent weight between 400 and 2500. For example, there are suitable commercial epoxy resins with the following properties:

| Resin | Melting Range (°C.) | Molecular Weight | Epoxide Equivalent Weight |
|---|---|---|---|
| 1 | 60–70 | about 900 | 400–500 |
| 2 | 77–85 | about 1060 | 600–700 |
| 3 | 90–95 | about 1350 | 800–920 |
| 4 | 90–100 | about 1400 | 850–940 |
| 5 | 120–130 | about 2900 | 1700–2050 | or mixtures of such epoxy resins. Especially well suited are epoxy resins or mixtures with an average molecular weight between 1300 and 1450 and with a epoxide equivalent weight between 750 and 1000.

The epoxy resin is reacted with a mixture of (a) 74 to 64 mole percent of methacrylic acid and/or acrylic acid and (b) 26 to 36 mole percent of at least one long chain monocarboxylic acid, i.e. long chain aliphatic carboxylic acids. As component (a) there are preferred mixtures containing more than 50 mole percent methacrylic acid. Most preferred is use of methacrylic acid alone. As component (b) there are used saturated monocarboxylic acids with 8 to 20 carbon atoms, e.g., alkanoic acids, especially straight chain alkanoic acids such as caprylic acid, pelargonic acid, capric acid, lauric acid, myristic acid, palmitic acid, margaric acid, stearic acid or arachidic acid. There can also be used commercial industrial mixtures of such acids. Especially preferred are saturated straight chain monocarboxylic acids with 10 to 14 carbon atoms and their mixtures or mixtures of lower and higher straight chain monocarboxylic acids whose average number of carbon atoms is between 10 and 14. Particularly preferred is the readily available lauric acid. Alternatively as component (b) there can also be used a mixture of at least one saturated monocarboxylic acid having 8 to 20 carbon atoms (e.g. an alkanoic acid) and up to 20 mole percent of at least one unsaturated monocarboxylic acid having 8 to 20 carbon atoms, e.g. alkenoic acids and hydroxy-alkenoic acids. Examples of such unsaturated monocarboxylic acids above all are straight chain acids with only a single double bond such as lauroleic acid, myristoleic acid, palmitoleic acid, oleic acid, ricinoleic acid, arachidonic acid and gadoleic acid or their mixtures. Particularly suited is oleic acid.

The reaction between the epoxy resin and the mixture of acids is carried out in the presence of a catalyst known in itself which is added in the customary amount, for example 0.5 to 2.5 weight percent based on the weight of the epoxy resin employed. Suitable catalysts for example are primary amines such as ethylenediamine, tetramethylene diamine, hexyl amine, butyl amine, tertiary amines, such as trimethyl amine, dimethylbenzyl amine, triethyl amine, tri-n-butyl amine, tri-n-hexyl amine, dimethyl-p-toluidine or di-isopropylor-p-toluidine, inorganic oxides or salts such as $SnO_2$, $SnCL_2$, $SnCl_4$, $CrCl_3$, $Sb_2O_3$, $LiF$ or mixtures of such oxides or salts and tertiary amines; tertiary phosphines such as triphenyl phosphine; tertiary stibenes such as triphenyl stibene; acid addition salts of secondary amines such as diethylamine hydrochloride or dimethylamine acrylate; quaternary ammonium salts such as tetramethyl ammonium chloride; or nitrogen containing heterocyclics such as pyridine, morpholine, quinoline or $\alpha$-picoline. The preferred catalyst is triethyl amine.

The reaction between the epoxy resin and the acid mixture can be carried out in the absence of a solvent or in the presence of an inert solvent. It is particularly advantageous if the reaction takes place in at least a part of the monomer forming the component (B) of the binder of the invention.

In order to avoid a polymerization during the reaction between the epoxy resin and the mixture of acids advantageously there is added an inhibitor for radical polymerization. Suitable inhibitors for example are hydroquinone, hydroquinone monomethyl ether, or the particularly preferred 2,4-dimethyl-6-tert.butyl phenol.

The reaction between the epoxy resin and the mixture of acids is suitably carried out at temperatures between 50° and 100° C., although the exact temperature is not critical.

The reaction is carried out with approximately stoichiometrical amounts, thus with about one mole of acid to 0.8 to 1.2 equivalents of epoxide. An about 10% excess of the epoxy resin over the stoichiometric amount of acid is preferred.

The component (B) of the binder of the invention is a mixture of 70 to 95 weight percent of methyl methacrylate as the main constituent and 30 to 5 weight percent of at least one further monomer copolymerizable with the unsaturated $\beta$-hydroxy ester. Such monomers for example are alkyl acrylates and methacrylates, e.g. n-butyl methacrylate 2-ethylbutyl acrylate, 2-ethylbutyl methacrylate, 2-ethylhexyl acrylate, 2-ethylhexyl methacrylate, n-heptyl acrylate, n-heptyl methacrylate, n-decyl acrylate or n-decyl methacrylate; hydroxyalkyl acrylates and methacrylates such as 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 3-hydroxybutyl acrylate or 3-hydroxybutyl methacrylate; or alkoxyalkyl acrylates or methacrylates such as 2-ethoxyethyl acrylate, 2-ethoxyethyl methacrylate or ethyltriethyleneglycol methacrylate. Preferably there are used n-butyl acrylate, n-butyl methacrylate, 2-ethylhexyl acrylate, 2-hydroxypropyl methacrylate, 2-ethoxyethyl acrylate, 2-ethoxyethyl methacrylate and ethyltriethylene-glycol methacrylate or mixtures of these monomers. Especially preferred is 2-ethyl hexyl acrylate.

Component (B) can also contain up to 3 weight percent of at least one known crosslinking agent for acrylate or methacrylate resins. Suitable crosslinking agents especially are compounds which contain at least two vinyl and/or allyl groups in the molecule, e.g. multifunctional esters of acrylic acid or methacrylic acid, such as ethylene glycol dimethacrylate, triethylene glycol dimethyacrylate, tetraethylene glycol dimethacrylate, 1,4-butanediol diacrylate, 1,6-hexanediol diacrylate, neopentyl glycol diacrylate, diethylene glycol diacrylate, pentaerythritol triacrylate, and pentaerythritol tetraacrylate, or triallyl compounds such as triallyl cyanurate.

A particularly advantageous way to produce the binders of the invention is as follows:

There is present a sufficient amount of at least one of the monomers forming component (B) to at least dissolve the epoxy resin employed and it is heated to the desired reaction temperature. The polymerization inhibitor is added before the heating or during the heating, the epoxy resin is suitably added in small portions during the heating. After the epoxy resin has gone completely into solution, the catalyst for the reaction is added with the mixture of acids. Then in a time span of about one-half hour up to about four hours the mixture of acids is dosed in either continuously or in portions. Subsequently the reaction mixture is held for 2 to 10 hours at the reaction temperature. It is suitable to carry out the reaction in the presence of an oxygen containing gaseous mixture, especially air, for example by leading the gaseous mixture through the reaction mixture. The course of the reaction can be followed in a simple manner through occasional determination of the acid number. The solution of the unsaturated $\beta$-hydroxy ester formed is a base resin which for the intended use is then mixed with the remainder of the monomers forming component (B). Particularly in a suitable manner the optionally included cross-linking monomers should only be subsequently added to the solution of the unsaturated $\beta$-hydroxy ester. Furthermore there can now also be added the necessary sensitizer required for a latter UV hardening, for example one of the customary benzophenone derivatives, as well as in a given case a small amount of paraffin.

The binders of the invention can be used as such for the production of clear, transparent coatings. However, in most cases there are added pigments and/or filling materials, both for economical reasons and for obtaining specific processing properties and mechanical properties of the coatings.

As pigments there are chiefly added inorganic coloring pigments in the form of dry powders such as titanium dioxide (rutile and anatase types), chrome yellow, chrome green, black iron oxide, red iron oxide or cobalt blue as well as mixtures of such pigment powders.

The pigments can also be added in the form of pastes, e.g., based on dialkyl phthalate. Organic dyestuffs can be added if they are resistant to the peroxidic hardeners.

The amount of pigment which is added in thin coatings up to 1.5 mm is between 5 and 15 weight percent, calculated on the total weight of the coating composition, in case high covering power is required. With thicker coatings of about 2 to 6 mm for the most parts 2 to 5 weight percent of pigment is sufficient.

As fillers for thin coatings there can be employed chiefly rock meal, e.g. pulverized quartz, calcite, chalk spars, as well as calcined bauxite, aluminum silicate, magnesium silicate as well as mical products.

The amount of addition depending upon the desired flow properties is between 25 and 50 weight percent based on the total weight of the coating composition.

For thicker coatings (about 2 to 6 mm) there can be added besides the above mentioned rock meals still coarser additives. There are preponderantly empolyed added quartz sands of specified particles sizes. In order to produce good working properties and high filling grades frequently there are added mixtures of different particle sizes. As a guide line the largest particle should have a diameter one third the thickness of the coating. The amount of additive is between 30 and 75 weight percent, calculated on the total weight of the coating composition. For decorative coatings there are also employed colored quartz sands.

Besides quartz sands there can also be employed quartz chips (broken particles) and e.g. basalts, coarse fractions of broken calcites, dolomites and calcined flintstones.

Special fillers are:

(a) calcined bauxite, electrocorundum (fused alumina) for high wear resistant coatings. These hard fillers are also frequently strewn as gripping agent in the still unhardened coatings and therefore after the hardening produce slip resistant, abrasion resistant coatings.

(b) metal powders such as aluminum powder, aluminum flakes, copper powder and flakes, zinc and nickel powder, as well as coarsely crystalline graphite for electrico conducting or antistatic coatings.

(c) for flame resistant coatings there are added aluminum hydroxide fillers of different particle sizes.

(d) to improve the flow properties of highly filled coating compositions there can be added special glass beads.

For specific purposes of use, e.g. for base coating compositions for the production of coatings having a layer thickness over 0.5 mm or for road marking compositions in certain cases an additional flexibilization through external plasticizer is suitable. The external plasticizer can be added in amounts between 10 and 100 weight percent, based on the weight of component (B). Suitable external plasticizers are for example, plastic urea resins, hydrocarbon resins, modified sulfonic acid esters and chloroparaffins, particularly those with a high chlorine content. In a given case mixtures of such external plasticizers can also be added.

The coating compositions produced with the binders of the invention can be used for overcoats on various bases, e.g., on concrete, asphalt, steel or wood. They are also particularly suitable for the production of road markings.

Therefore a further object of the invention is the use of these binders for the production of street marking compositions.

For street marking compositions there are added as pigments titanium dioxide (rutile and anatase) and chrome yellow in amounts of 5 to 15 weight percent, additionally there are added as fine fillers quartz meal, calcite, barite, dolomite (10 to 20 weight percent), as coarse fillers (up to a maximum of 1 mm particle size) quartz sands, calcined cristobalite, calcined flintstone, calcite, dolomite (10 to 40 weight percent) as well as special reflective beads (glass beads of 50 to 400 μm) in amounts of 10 to 40 weight percent.

As thixotropic agents for wall coatings and to prevent sedimentation in marking compositions there can be added pyrogenic silicas and special asbestos fibers.

The binders of the invention are preferably hardened with the help of known radical formers. Especially preferred is the hardening at room or slightly elevated temperature with the help of a redox system consisting of at least one peroxide e.g. dibenzoyl peroxide or dilauroyl peroxide and at least one tertiary amine, e.g. dimethyl para toluidine, diisopropylol para toluidine, dihydroxy propyl para-toluidine. Preferably there are used amounts of 0.2 to 5 weight percent of peroxide and 0.1 to 3 weight percent of amine based on the weight of the binder.

It has proven particularly desirable to add the amine to the solution of the unsaturated β-hydroxy ester and to mix in the peroxide in a given case in part of the filler or pigment used.

The hardening time of the unfilled or filled finished coating compositions can be controlled in a wide range between fractions of a second in UV hardening up to several hours with the use of a redox system. In establishing a customary hardening time between about 10 and 60 minutes there can be observed a relatively late beginning of the increase of temperature and viscosity. The hardening then occurs almost suddenly. This effect is of particular value because through it in comparison to the overall hardening time employed in each case there results a relatively long pot life (working time).

There is described next the production of various base resins from which there are obtained typical binders of the invention by mixing with further monomers.

Unless otherwise indicated, all parts and percentages are by weight.

The compositions can comprise, consist essentially of or consist of the materials set forth.

Base Resin A

There were weighed into a 1 liter Witt pot
190.2 parts by weight of unstabilized methyl methacrylate
6.39 parts by weight of triethyl amine
1.22 parts by weight of 2,4-dimethyl-6-tert.-butylphenol and
500.0 parts by weight of an epoxy resin based on bisphenol A and epichlorohydrin having a molecular weight of about 1400 and an epoxide equivalent weight of 860 and allowed to stand for 2 hours at room temperature to swell. Subsequently the mixture was dispersed for 15 minutes in a Dissolver. The Witt pot was then furnished with a four necked cover having a stirrer, reflux condenser, thermometer and dosing vessel and placed in a water bath. Under continuous stirring the contents of the pot were brought to a temperature of 80° C. within about 80 minutes. After this time the epoxy resin was completely dissolved. There were then added continuously from the dosing vessel within 2 hours a mixture of
31.5 parts by weight of methacrylic acid and
31.4 parts by weight of lauric acid
while the temperature was held to 80° C. After the end of the addition of acid the reaction mixture was stirred an additional 8 hours at 80° C. The acid number (in mg KOH/g) then was 7.6, the epoxide equivalent weight 5580.

Base Resin B

The production was carried out in the same manner as with base resin A with the single difference that there were employed 500.0 parts by weight of an epoxy resin based on bisphenol A and epichlorohydrin having a molecular weight of 1350 and a epoxide equivalent weight of 932.

The acid number of the base resin was 3.1, the epoxide equivalent weight 6337.

Base Resin C

There were heated to 80° C. 188.4 parts by weight of unstabilized methyl methacrylate in a heatable 1 liter Witt pot equipped with a stirrer, reflux condenser, thermometer and dosing vessel. During the heating there were added under continuous stirring 500.0 parts by weight of an epoxy resin based on bisphenol A and epichlorohydrin having a molecular weight of about 1400 and an epoxide equivalent weight of 860 and 1.21 parts by weight of 2,4-dimethyl-6-tert.-butylphenol. After dissolution of the epoxy resin there were added at 80° C. 6.33 parts by weight of triethyl amine. There were then added continuously from the dosing vessel within two hours a mixture of
26.4 parts by weight of acrylic acid and
31.4 parts by weight of lauric acid
while the temperature was held at 80° C. After the end of the addition of acid the reaction mixture was stirred an additional 8 hours at 80° C. The acid number was then 5.3, the epoxide equivalent weight 5554.

Base Resin D

As in the case of base resin C there were reacted
382.5 parts by weight of n-Butylmethacrylate
500.0 parts wy weight of an epoxy resin based on bisphenol A and epichlorohydrin having a molecular weight of about 1400 and an epoxide equivalent weight of 860.
1.53 parts by weight 2,4-dimethyl-6-tert.-butylphenol
8.03 parts by weight triethyl amine
29.5 parts by weight methacrylic acid and
34.3 parts by weight lauric acid.

The acid number of this base resin was 5.2, the epoxide equivalent weight 4314.

Base Resin E

The production was carried out as with base resin C but using the following materials:
243.7 parts by weight n-butylacrylate
500.0 parts by weight of an epoxy resin based on bisphenol A and epichlorohydrin with a molecular weight of about 1400 and an epoxide equivalent weight of 860
1.3 parts by weight 2,4-dimethyl-6-tert.-butylphenol
6.82 parts by weight triethyl amine
27.9 parts by weight of methacrylic acid and
32.5 lauric acid The acid number of this base resin was 5.2, the epoxide equivalent weight 7529.

Base Resin F

The production was carried out as with base resin E with the single difference that there were employed
500.0 parts by weight of an epoxy resin based on bisphenol A and epichlorohydrin having a molecular weight of about 1350 and an epoxide equivalent weight of 932.

The acid number of this base resin was 1.0, the epoxide equivalent weight 5520.

Base Resin G

The production was carried out as with base resin C, but using the following materials:
243.7 parts by weight 2-ethoxyethylmethacrylate
500.0 parts by weight of an epoxy resin based on bisphenol A and epichlorohydrin having a molecular weight of about 1400 and an epoxide equivalent weight of 860
1.3 parts by weight 2,4-dimethyl-6-tert.-butylphenol
6.82 parts by weight triethylamine
27.9 parts by weight methacrylic acid and
32.5 parts by weight lauric acid The acid number of this base resin was 4.5, the epoxide equivalent weight 6010.

Base Resin H

The production was carried out as with base resin G with the single difference that there were added
500.0 parts by weight of an epoxy resin based on bisphenol A and epichlorohydrin with a molecular weight of about 1350 and an epoxide equivalent weight of 932

The acid number of this base resin was 1.3, the epoxide equivalent weight 5456.

Base Resin I

The production was carried out as with base resin C but with the following materials:
96.0 parts by weight unstabilized methylmethacrylate
300.0 parts by weight of an epoxy resin based on bisphenol A and epichlorohydrin with a molecular weight of about 900 and an epoxide equivalent weight of 450
0.786 parts by weight 2,4-dimethyl-6-tert.-butylphenol
2.93 parts by weight triethylamine
36.6 parts by weight methacrylic acid and
42.6 parts by weight lauric acid.

The acid number of this base resin was 6.9, the epoxide equivalent weight 5600.

Base Resin K

The production was carried out as with base resin C but with the following materials:
191.3 parts by weight unstabilized methyl methacrylate
500.0 parts by weight of an epoxy resin based on bisphenol A and epichlorohydrin with a molecular weight of about 1400 and an epoxide-equivalent weight of 860
1.22 parts by weight 2,4-dimethyl-6-tert.-butylphenol
6.43 parts by weight triethylamine
30.0 parts by weight methacrylic acid and
36.2 parts by weight of an industrial coconut oil fatty acid.

The coconut oil fatty acid employed had the following composition

| $C_8$ | $C_{10}$ | $C_{12}$ | $C_{14}$ | $C_{16}$ | $C_{18}$ | $C_{18}$ | with double bond |
|---|---|---|---|---|---|---|---|
| 8 | 7 | 48 | 18 | 8 | 2 | 9 | percent by weight |

The acid number of this base resin was 8.9, the epoxide equivalent 7060.

The previously described base resins A to K were mixed with further monomers to form the binders of the invention which are set forth in the following examples 1 to 31.

The following tests were carried out on the finished binders of the invention.

1. Determination of the Mechanical Properties

The respective binders were treated with 1 weight percent of dibenzoyl peroxide and with 0.5 weight percent of diisopropylol-p-toluidine and allowed to harden without supplying heat between two glass plates having an interval of about 3.5 mm to form a sheet having a thickness of 3 mm. The appearance of the hardened sheet was evaluated visually. Dynstat samples were sawed out of the sheets, reground and measured.

There were determined on the thus produced samples according to DIN 53452 (German Industrial Standard 53452) the flexural strength (N/mm$^2$),*[1] according to DIN 53456 the indentation hardness (N/mm$^2$)[1] and according to DIN 53453 the impact resistance [kJ/m$^2$]. [2]

[1] Newton/mm$^2$ according to SI
[2] Kilojoule/m$^2$ according to SI

2. Determination of the Pot Life

The respective binders were treated with 1 weight percent of dibenzoyl peroxide and with 0.5 weight percent of diisopropylol-p-toluidine. A 20 gram sample was poured into a polyethylene shell having a capacity of 25 cm$^3$ in which there was inserted a thermoelement (iron/constantan) and allowed to harden without supplying heat. With a recording thermometer the time was ascertained after which the sample reached the highest temperature ($T_{max}$). The elapsed time ($t_{max}$) until reaching $T_{max}$ corresponds to about the pot life of the binder in using the stated catalyst system.

EXAMPLE 1

75.31 parts by weight of base resin A
141.41 parts by weight methyl methacrylate and 8.44 parts by weight of 2-ethylhexyl acrylate were mixed together at room temperature.

The binder obtained consisted of about 25 weight percent of an unsaturated β-hydroxyester and about 75 weight percent of monomers copolymerizable therewith. Its time of outflow of a Ford cup having a 4 mm nozzle was 12.2 seconds. It was storage stable for over a year.

The tests carried out therewith had the following results:

Appearance of the 3 mm thick sheet:
Appearance of shrinking at the surface

| | |
|---|---|
| Flexural strength: | 127N/mm$^2$ |
| Ball-pressure hardness: | 97N/mm$^2$ |
| Impact resistance: | 11kJ/m$^2$ |
| $T_{max}$ | 143° C. |
| $t_{max}$ | 39 min. |

EXAMPLE 2

75.31 parts by weight of base resin B
141.41 parts by weight of methyl methacrylace and
8.44 parts by weight of 2-ethylhexyl acrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.2 seconds. It is storage stable for over one year.

The tests carried out therewith had the following results.

Appearance of the 3 mm thick sheet: Appearance of shrinkage at the surface

| | |
|---|---|
| Flexural strength | 121N/mm$^2$ |
| Indentation hardness | 90N/mm$^2$ |
| Impact resistance | 10kJ/m$^2$ |
| $T_{max}$ | 119° C. |
| $t_{max}$ | 50 min. |

EXAMPLE 3

75.31 parts by weight of base resin B
34.46 parts by weight of methyl methacrylate and
2.81 parts by weight of 2-ethylhexyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 77 seconds. It is storage stable for over one year.

The tests carried out therewith had the following results:

Appearance of 3 mm thick sheet: appearance of shrinkage at the edge

| | |
|---|---|
| Flexural strength: | 115N/mm$^2$ |
| Indentation hardness: | 147N/mm$^2$ |
| Impact strenght: | 14kJ/m$^2$ |
| $T_{max}$: | 125° C. |
| $t_{max}$: | 41 min. |

EXAMPLE 4

75.31 parts by weight of base resin A
34.46 parts by weight of methyl methacrylate and
2.81 parts by weight of 2-ethylhexyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 85 seconds. It is storage stable for over one year.

The tests carried out therewith had the following results:

Appearance of the 3 mm thick sheet: appearance of shrinkage at the surface

| | |
|---|---|
| Flexural strength: | 129N/mm$^2$ |
| Indentation hardness: | 126N/mm$^2$ |
| Impact resistance: | 16kJ/m$^2$ |
| $T_{max}$: | 123° C. |
| $t_{max}$: | 38 min. |

EXAMPLE 5

75.31 parts by weight of base resin B
20.38 parts by weight of methyl methacrylate and
16.90 parts by weight of 2-ethylhexyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 123 seconds. It is storage stable for over one year.

The tests carried out therewith had the following results:

Appearance of the 3 mm thick sheet: No appearance of shrinkage

| | |
|---|---|
| Flexural strength: | 109N/mm$^2$ |
| Indentation hardness: | 133N/mm$^2$ |
| Impact resistance: | 15kJ/m$^2$ |
| $T_{max}$: | 107° C. |
| $t_{max}$: | 42 min. |

EXAMPLE 6

75.31 parts by weight of base resin A
20.38 parts by weight of methyl methacrylate and
16.90 parts by weight of 2-ethylhexyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 105 seconds. It is storage stable for over one year.

The tests carried out therewith had the following results:

Appearance of the 3 mm thick sheet: No appearance of shrinkage

| | |
|---|---|
| $T_{max}$: | 116° C. |
| $t_{max}$: | 36 min. |

EXAMPLE 7

75.31 parts by weight of base resin A
16.62 parts by weight of methyl methacrylate and
1.88 parts by weight of 2-ethylhexyl acrylate were mixed together at room temperature.

The binder obtained consisted of about 60 weight percent of an unsaturated β-hydroxy ester and about 40 weight percent of monomers copolymerizable therewith. Its time of outflow of a Ford cup with a 4 mm nozzle was 418 seconds. It is storage stable for over one year.

The tests carried out therewith had the following results:

Appearance of the 3 mm thick sheet: Slight appearance of shrinkage

| Flexural strength: | 115N/mm$^2$ |
| --- | --- |
| Indentation hardness: | 142N/mm$^2$ |
| Impact resistance: | 15kJ/m$^2$ |
| $T_{max}$: | 104° C. |
| $t_{max}$: | 35 min. |

EXAMPLE 8

75.31 parts by weight of base resin A
7.24 parts by weight of methyl methacrylate and
11.26 parts by weight of 2-ethylhexyl acrylate were mixed together at room temperature.

The binder obtained consisted of about 60 weight percent of an unsaturated β-hydroxy ester and about 40 weight percent of monomers copolymerizable therewith. It is storage stable for over one year.

The tests carried out therewith had the following results:

Appearance of the 3 mm thick sheet: No appearance of shrinkage.

| Flexural strength | 103N/mm$^2$ |
| --- | --- |
| Indentation hardness: | 126N/mm$^2$ |
| Impact resistance | 14kJ/m$^2$ |
| $T_{max}$: | 104° C. |
| $t_{max}$: | 35 min. |

EXAMPLE 9

75.31 parts by weight of base resin B
141.41 parts by weight of methyl methacrylate and
8.44 parts by weight of 2-ethoxyethyl methacrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12 seconds. It is storage stable for over one year.

The tests carried out therewith had the following results:

Appearance of the 3 mm thick sheet: Appearance of shrinkage at the surface

| Flexural strength: | 123N/mm$^2$ |
| --- | --- |
| Indentation hardness: | 116N/mm$^2$ |
| Impact resistance: | 12kJ/m$^2$ |
| $T_{max}$: | 121° C. |
| $t_{max}$: | 49 min. |

EXAMPLE 10

75.31 parts by weight of base resin A
141.41 parts by weight of methyl methacrylate and
8.44 parts by weight of 2-ethoxyethyl methacrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12 seconds. It is storage stable for over one year.

The tests carried out therewith had the following results:

Appearance of the 3 mm thick sheet: Appearance of shrinkage at the surface

| Flexural strength: | 124N/mm$^2$ |
| --- | --- |
| Indentation | 118N/mm$^2$ |
| Impact resistance: | 12kJ/m$^2$ |
| $T_{max}$: | 143° C. |
| $t_{max}$: | 38 min. |

EXAMPLE 11

75.31 parts by weight of base resin B
34.46 parts by weight of methyl methacrylate and
2.81 parts by weight of 2-ethoxyethyl methacrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 78 seconds. It is storage stable for over one year.

The tests carried out therewith had the following results:

Appearance of the 3 mm thick sheet: Appearance of shrinkage at the edge

| Flexural strength: | 120N/mm$^2$ |
| --- | --- |
| Indentation hardness: | 169N/mm$^2$ |
| Impact resistance: | 14kJ/m$^2$ |
| $T_{max}$: | 118° C. |
| $t_{max}$: | 46 min. |

EXAMPLE 12

75.31 parts by weight of base resin A
34.46 parts by weight of methyl methacrylate and
2.81 parts by weight of 2-ethoxyethyl methacrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 84 seconds. It is storage stable for over one year.

The tests carried out therewith had the following results:

Appearance of the 3 mm thick sheet: Appearance of shrinkage at the edge

| Flexural strength: | 112N/mm$^2$ |
| --- | --- |
| Indentation hardness: | 141N/mm$^2$ |
| Impact resistance: | 15kJ/m$^2$ |
| $T_{max}$: | 125° C. |

-continued

| | |
|---|---|
| $t_{max}$: | 36 min. |

EXAMPLE 13

75.31 parts by weight of base resin B
99.19 parts by weight of methyl methacrylate and
50.66 parts by weight of n-butyl acrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.5 seconds. It is storage stable for over one year.

The tests carried out therewith had the following results:

Appearance of the 3 mm thick sheet: Appearance of shrinkage at the edge

| | |
|---|---|
| Flexural strength: | 92N/mm$^2$ |
| Indentation hardness: | 116N/mm$^2$ |
| Impact resistance: | 8kJ/m$^2$ |
| $T_{max}$: | 127° C. |
| $t_{max}$: | 44 min. |

EXAMPLE 14

75.31 parts by weight of base resin A
99.19 parts by weight methyl methacrylate and
50.66 parts by weight n-butyl acrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.5 seconds. It is storage stable for over one year.

The tests carried out therewith had the following results:

Appearance of the 3 mm thick sheet: Slight appearance of shrinkage

| | |
|---|---|
| $T_{max}$: | 138° C. |
| $t_{max}$: | 33 min. |

EXAMPLE 15

75.31 parts by weight of base resin B
20.38 parts by weight of methyl methacrylate and
16.89 parts by weight of n-butyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 98 seconds. It is storage stable for over one year.

The tests carried out therewith had the following results:

Appearance of the 3 mm thick sheet: Slight appearance of shrinkage

| | |
|---|---|
| Flexural strength: | 109N/mm$^2$ |
| Indentation hardness: | 116N/mm$^2$ |
| Impact resistance | 15kJ/m$^2$ |
| $T_{max}$ | 120° C. |
| $t_{max}$: | 42 min. |

EXAMPLE 16

75.31 parts by weight of base resin A
20.38 parts by weight of methyl methacrylate and
16.89 parts by weight of n-butyl acrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 93 seconds. It is storage stable for over one year.

The tests carried out therewith had the following results:

Appearance of the 3 mm thick sheet: No appearance of shrinkage

| | |
|---|---|
| $T_{max}$: | 119° C. |
| $t_{max}$: | 34 min. |

EXAMPLE 17

75.31 parts by weight of base resin A
7.24 parts by weight of methyl methacrylate and
11.26 parts by weight of n-butyl acrylate were mixed together at room temperature.

The binder obtained consisted of about 60 weight percent of an unsaturated β-hydroxy ester and about 40 weight percent of monomers copolymerizable therewith. It is storage stable for over one year.

The tests carried out therewith had the following results:

Appearance of the 3 mm thick sheet: No appearance of shrinkage

| | |
|---|---|
| Flexural strength: | 114N/mm$^2$ |
| Indentation hardness: | 133N/mm$^2$ |
| Impact resistance: | 16kJ/m$^2$ |
| $T_{max}$: | 112° C. |
| $t_{max}$: | 33 min. |

EXAMPLE 18

75.31 parts by weight of base resin B
99.19 parts by weight of methyl methacrylate and
50.66 parts by weight of n-butyl methacrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.6 seconds. It is storage stable for over one year.

The tests carried out therewith had the following results:

Appearance of the 3 mm thick sheet: Appearance of shrinkage at the edge.

| | |
|---|---|
| Flexural strength: | 111N/mm$^2$ |
| Indentation hardness: | 96N/mm$^2$ |
| Impact resistance: | 9kJ/m$^2$ |

| | |
|---|---|
| $T_{max}$: | 135° C. |
| $t_{max}$: | 44 min. |

EXAMPLE 19

75.31 parts by weight of base resin A
99.19 parts by weight of methyl methacrylate and
50.66 parts by weight of n-butyl methacrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.7 seconds. It is storage stable for over one year.

The tests carried out therewith had the following results:

Appearance of the 3 mm thick sheet: Appearance of shrinkage at the surface

| | |
|---|---|
| Flexural strength: | 118N/mm$^2$ |
| Indentation hardness: | 97N/mm$^2$ |
| Impact resistance: | 10kJ/m$^2$ |
| $T_{max}$: | 138° C. |
| $t_{max}$: | 38 min. |

EXAMPLE 20

75.31 parts by weight of base resin B
20.38 parts by weight of methyl methacrylate and
16.89 parts by weight of n-butyl methacrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 103 seconds. It is storage stable for over one year.

The tests carried out therewith had the following results:

Appearance of the 3 mm thick sheet: Appearance of shrinkage at the edge.

| | |
|---|---|
| Flexural strength: | 120N/mm$^2$ |
| Indentation hardness: | 120N/mm$^2$ |
| Impact resistance: | 15kJ/m$^2$ |
| $T_{max}$: | 119° C. |
| $t_{max}$: | 35 min. |

EXAMPLE 21

75.31 part by weight of base resin A
20.38 parts by weight of methyl methacrylate and
16.89 parts by weight of n-butyl methacrylate were mixed together at room temperature.

The binder obtained consisted of about 50 weight percent of an unsaturated β-hydroxy ester and about 50 weight percent of monomers copolymerizable therewith. Its time of outflow of a Ford cup with a 4 mm nozzle was 97 seconds. It is storage stable for over one year.

The tests carried out therewith had the following results:

Appearance of the 3 mm thick sheet: Slight appearance of shrinkage

| | |
|---|---|
| Flexural strength: | 109N/mm$^2$ |
| Indentation hardness: | 155N/mm$^2$ |
| Impact resistance: | 14kJ/m$^2$ |
| $T_{max}$: | 114° C. |
| $t_{max}$: | 42 min. |

EXAMPLE 22

75.31 parts by weight of base resin A
16.62 parts by weight of methyl methacrylate and
1.88 parts by weight of n-butyl methacrylate were mixed together at room temperature.

The binder obtained consisted of about 60 weight percent of an unsaturated β-hydroxy ester and about 40 weight percent of monomers copolymerizable therewith. It is storage stable for over one year.

The tests carried out therewith had the following results:

Appearance of the 3 mm thick sheet: Slight appearance of shrinkage

| | |
|---|---|
| Flexural strength: | 113N/mm$^2$ |
| Indentation hardness: | 142N/mm$^2$ |
| Impact resistance: | 14kJ/m$^2$ |
| $T_{max}$: | 109° C. |
| $t_{max}$: | 36 min. |

EXAMPLE 23

75.31 parts by weight of base resin C
99.19 parts by weight of methyl methacrylate and
50.66 parts by weight of n-butyl acrylate were mixed together at room temperature.

The binder obtained consisted of about 25 weight percent of an unsaturated β-hydroxy ester and about 75 weight percent of monomers copolymerizable therewith. Its time of outflow of a Ford cup with a 4 mm nozzle was 12.5 seconds. It is storage stable for over one year.

The tests carried out therewith had the following results:

Appearance of the 3 mm thick sheet: Appearance of shrinkage of the edge

| | |
|---|---|
| Flexural strength: | 95N/mm$^2$ |
| Indentation hardness: | 93N/mm$^2$ |
| Impact resistance: | 9kJ/m$^2$ |
| $T_{max}$: | 128° C. |
| $t_{max}$: | 43 min. |

EXAMPLE 24

94.63 parts by weight of base resin D and
114.75 parts by weight of methyl methacrylate were mixed together at room temperature.

The binder obtained consisted of about 26.9 weight percent of an unsaturated β-hydroxy ester and about 73.1 weight percent of monomers copolymerizable therewith. Its time of outflow of a Ford cup with a 4 mm nozzle was 13 seconds. It is storage stable for over one year.

The tests carried out therewith had the following results:

Appearance of the 3 mm thick sheet: Appearance of shrinkage at the edge.

| Flexural strength: | 98N/mm² |
|---|---|
| Indentation hardness: | 102N/mm² |
| Impact resistance: | 8kJ/m² |
| $T_{max}$: | 107° C. |
| $t_{max}$: | 43 min. |

EXAMPLE 25

80.41 parts by weight of base resin E and
56.86 parts by weight of methyl methacrylate were mixed together at room temperature.

The binder obtained consisted of about 40.8 weight percent of an unsaturated β-hydroxy ester and about 59.2 weight percent of monomers copolymerizable therewith. Its time of outflow of a Ford cup with a 4 mm nozzle was 31 seconds. It is storage stable for over one year.

The tests carried out therewith had the following results:

Appearance of the 3 mm thick sheet: No appearance of shrinkage:

| Flexural strength: | 99N/mm² |
|---|---|
| Indentation hardness: | 135N/mm² |
| Impact resistance: | 12kJ/m² |
| $T_{max}$: | 124° C. |
| $t_{max}$: | 45 min. |

EXAMPLE 26

80.41 parts by weight of base resin F and
56.86 parts by weight of methyl methacrylate were mixed together at room temperature.

The binder obtained consisted of about 40.8 weight percent of an unsaturated β-hydroxy ester and about 59.2 weight percent of monomers copolymerizable therewith. Its time of outflow of a Ford cup with a 4 mm nozzle was 29 seconds. It is storage stable for over one year.

The tests carried out therewith had the following results:

Appearance of the 3 mm thick sheet: No appearance of shrinkage

| Flexural strength: | 100N/mm² |
|---|---|
| Indentation hardness: | 133N/mm² |
| Impact resistance: | 9kJ/m² |
| $T_{max}$: | 120° C. |
| $t_{max}$: | 56 min. |

EXAMPLE 27

80.41 parts by weight of base resin G and
56.86 parts by weight of methyl methacrylate were mixed together at room temperature.

The binder obtained consisted of about 40.8 weight percent of an unsaturated β-hydroxy ester and about 59.2 weight percent of monomers copolymerizable therewith. Its time of outflow of a Ford cup with a 4 mm nozzle was 30 seconds. It is storage stable for over one year.

The tests carried out therewith had the following results:

Appearance of the 3 mm thick sheet: No appearance of shrinkage

| Flexural strength: | 115N/mm² |
|---|---|
| Indentation hardness: | 143N/mm² |
| Impact resistance: | 14kJ/m² |
| $T_{max}$: | 125° C. |
| $t_{max}$: | 37 min. |

EXAMPLE 28

80.41 parts by weight of base resin H and
56.86 parts by weight of methyl methacrylate were mixed together at room temperature.

The binder obtained consisted of about 40.8 weight percent of an unsaturated ⊕-hydroxy ester and about 59.2 weight percent of monomers copolymerizable therewith. Its time of outflow of a Ford cup with a 4 mm nozzle was 29 seconds. It is storage stable for over one year.

The tests carried out therewith had the following results:

Appearance of the 3 mm thick sheet: No appearance of shrinkage

| Flexural strength: | 110N/mm² |
|---|---|
| Indentation hardness: | 141N/mm² |
| Impact resistance: | 13kJ/m² |
| $T_{max}$: | 118° C. |
| $t_{max}$: | 55 min. |

EXAMPLE 29

47.52 parts by weight of base resin I
19.85 parts by weight of methyl methacrylate and
1.55 parts by weight of 2-ethylhexyl acrylate were mixed together at room temperature.

The binder obtained consisted of about 55 weight percent of an unsaturated β-hydroxy ester and about 45 weight percent of monomers copolymerizable therewith. It is storage stable for over one year.

The tests carried out therewith had the following results:

Appearance of the 3 mm thick sheet: Appearance of shrinkage at the edge

| Flexural strength: | 92N/mm² |
|---|---|
| Indentation hardness: | 115N/mm² |
| Impact resistance: | 7kJ/m² |
| $T_{max}$: | 119° C. |
| $t_{max}$: | 60 min. |

EXAMPLE 30

47.52 parts by weight of base resin I
12.10 parts by weight of methyl methacrylate and
9.30 parts by weight of 2-ethylhexyl acrylate were mixed together at room temperature.

The binder obtained consisted of about 55 weight percent of an unsaturated β-hydroxy ester and about 45 weight percent of monomers copolymerizable therewith. It is storage stable for over one year.

The tests carried out therewith had the following results:

Appearance of the 3 mm thick sheet: No appearance of shrinkage

| Flexural strength: | 81N/mm² |
|---|---|

| Indentation hardness: | 105N/mm² |
|---|---|
| Impact resistance: | 18kJ/m² |
| $T_{max}$: | 115° C. |
| $t_{max}$: | 51 min. |

EXAMPLE 31

75.95 parts by weight of base resin K
24.87 parts by weight of methyl methacrylate and
2.32 parts by weight of 2-ethylhexyl acrylate were mixed together at room temperature.

The binder obtained consisted of about 55 weight percent of an unsaturated β-hydroxy ester and about 45 weight percent of monomers copolymerizable therewith. It is storage stable for over one year.

The tests carried out therewith had the following results:

Appearance of the 3 mm thick sheet: Appearance of shrinkage at the edge

| Flexural strength: | 119N/mm² |
|---|---|
| Indentation hardness: | 133N/mm² |
| Impact resistance: | 13kJ/cm² |
| $T_{max}$: | 121° C. |
| $t_{max}$: | 26 min. |

In the following examples 32 to 36 there is illustrated the production of coating compositions with the help of the binder of the invention.

EXAMPLE 32

40.00 parts by weight of base resin A
30.00 parts by weight of methyl methacrylate
15.00 parts by weight of 2-ethylhexyl acrylate
1.00 part by weight of paraffin and
15.00 parts by weight of a difficulty saponifiable plasticizer based on an alkyl ($C_{12}$-$C_{20}$) sulfonic acid ester of alkyl substituted phenols (density at 20° C. about 1.08 g/cm³; viscosity at 20° C. 90 to 100 m Pas) were mixed together under slight heating.

A hardened sample after addition of 2 weight percent of dibenzoyl peroxide paste (50 weight percent in dibutyl phthalate) and 1 weight percent of diisopropylol-p-toluidine when tested according to DIN 53455 had a tensile strength of 24.3 N/mm² and an elongation at break of 40%.

60.00 parts by weight of the binder containing the plasticizer were treated and mixed with
40.00 parts by weight of fine barite
10.00 parts by weight of rutile titanium dioxide and
1.00 part by weight of a thixotropic agent based on fibreous asbestos. The mixture was divided into two parts. Part A was mixed with 0.50 parts by weight of diisopropylol-p-toluidine, part B was mixed with 5.00 parts by weight of dibenzoyl peroxide paste (50 weight percent in dibutyl phthalate). Subsequently both parts A and B were processed as a wall coating by means of a two component spraying apparatus. The coating having a thickness of about 0.5 mm was completely hardened after about 30 minutes.

EXAMPLE 33

40.00 parts by weight of the plasticizer containing binder of Example 32 were treated and mixed with
10.00 parts by weight of rutile titanium dioxide
50.00 parts by weight of silica flour and
1.00 part by weight of thixotropic agent based on fibreous asbestos. The mixture was again divided into two parts. Part A was mixed with 1.00 part by weight of diisopropylol-p-toluidine, part B was mixed with 5.00 parts by weight of dibenzoyl peroxide paste (50 weight percent of dibutyl phthalate). Subsequently both parts A and B were applied to a concrete road by means of a two component spraying apparatus as a street marking composition in a coating thickness of 0.5 to 1 mm. After about 10 minutes the marking was completely hardened.

EXAMPLE 34

A binder component was produced by mixing with slight heating
55.00 parts by weight of base resin B
30.00 parts by weight of methyl methacrylate
15.00 parts by weight of 2-ethylhexyl acrylate
1.00 part by weight of diisopropylol-p-toluidine and
1.00 part by weight of paraffin.

Separately therefrom a plasticizer component was produced by mixing 55.00 parts by weight of a chlorinated paraffin hydrocarbon having a chlorine content of 50 weight percent (density at 20° C. 1.26 g/cm³; viscosity about 20,000 m Pas)
38.00 parts by weight of carbamide plastic resin (93 to 96 weight percent solution in butanol; time of outflow of a Ford cup with a 4 mm nozzle at 23° C. 200 to 290 seconds; density at 20° C. 1.06 g/cm³; saponification number maximum 10) and
7.00 parts by weight of xylene.

By mixing 4 parts by weight of the binder component and 1 part by weight of the plasticizer component a sample was produced which hardened after addition of 2 weight percent of dibenzoyl peroxide paste (50 weight percent in dibutyl phthalate). The hardened sample in the test according to DIN 53455 showed a tensile strength of 5.1 N/mm² and an elongation at break of 98%.

Two partial mixtures were then produced for the machine laying of road marking.

Partial Mixture A 25.00 parts by weight of the above mentioned binder component
10.00 parts by weight rutile titanium dioxide
20.00 parts by weight reflecting beads
45.00 parts by weight quartz filler and
0.30 parts by weight thixotropic agent based on fibreous asbestos.

Partial Mixture B 25.00 parts by weight of the above mentioned plasticizer component
5.00 parts by weight dibenzoyl peroxide paste (50 weight percent in dibutyl phthalate).
10.00 parts by weight rutile titanium dioxide
20.00 parts by weight reflecting beads
40.00 parts by weight quartz filler and
0.30 parts by weight thixotropic agent based on fibreous asbestos.

The two partial mixtures A and B were filled into two separate tanks of a self propelled marking machine. By means of metering pumps, they were conveyed from these tanks in the ratio of 4:1 into a mixing chamber, mixed there and extruded through a corresponding fishtail die into the desired line width in a coating thickness of 1 to 1.5 mm. The markings could be applied to asphalt or preferably to concrete roads and hardened at 20° C. within 30 minutes.

EXAMPLE 35

40.00 parts by weight of the binder component of Example 34 and
10.00 parts by weight of the plasticizer component of Example 34 were mixed and treated with
45.00 parts by weight of silica flour
5.00 parts by weight of pigment powder and
1.00 parts by weight of benzoyl peroxide paste (50 weight percent in dibutyl phthalate).

The mixture was homogenized and used as a floor coating in a coating thickness of 1 to 2 mm. The complete hardening at 20° C. required about 45 minutes. The hardened coating was resistant to acids, alkalis and abrasion and exhibited a smooth, uniform surface.

EXAMPLE 36

A binder component was produced by mixing under slight heating
50.00 parts by weight of base resin B
15.00 parts by weight of 2-ethylhexyl acrylate
3.00 parts by weight ethyl-triethylene glycol methacrylate
32.00 parts by weight methyl methacrylate
0.50 parts by weight paraffin
0.40 parts by weight diisopropylol-p-toluidine and
0.40 parts by weight dimethyl-p-toluidine.
As plasticizer component there was used that described in Example 34.

A sample was produced by mixing 4 parts by weight of the binder component and 1 part by weight of the plasticizer component, which sample hardened after addition of 2 weight percent of dibenzoyl peroxide paste (50 weight percent in dibutyl phthalate). The hardened sample in testing according to DIN 53455 showed a tensile strength of 0.6 N/mm$^2$ and an elongation at break of 117%.

Again for the machine laying of street marking there were produced two partial mixtures and further processing was as described in Example 34. The markings could be applied to asphalt or concrete roads. Because of the particularly high elasticity the marking composition described here is particularly suited for the marking of asphalt streets.

The entire disclosure of German priority application P 29 06 844.8-43 is hereby incorporated by reference.

What is claimed is:

1. A binder for coating compositions based on a mixture of an unsaturated β-hydroxy ester with copolymerizable monomers, said binder consisting essentially of, on a total weight basis
   (A) 25 to 60 weight percent of an unsaturated β-hydroxy ester which is produced by reacting an epoxy resin based on bisphenol A and epichlorohydrin with a molecular weight between 800 and 3000 and an epoxide equivalent weight between 400 and 2500 with a mixture of
   (a) 74 to 64 mole percent of methacrylic acid, acrylic acid, or a mixture of methacrylic acid and acrylic acid, and
   (b) 26 to 36 mole percent of at least one saturated aliphatic monocarboxylic acid having 8 to 20 carbon atoms or a mixture of at least one saturated aliphatic monocarboxylic acid having 8 to 20 carbon atoms with up to 20 mole percent of an unsaturated aliphatic monocarboxylic acid having 8 to 20 carbon atoms, and
   (B) 75 to 40 weight percent of a mixture based on the weight of component (B) of
   (a) 70 to 95 weight methyl methacrylate,
   (b) 30 to 5 weight percent of at least one monomer of the formula $CH_2=CR_1-COOR_2$ where $R_1$ is hydrogen or a methyl group and $R_2$ is a straight chain alkyl group with 4 to 10 carbon atoms, a branched alkyl group with 6 to 12 carbon atoms, a hydroxy-alkyl group with 2 to 4 carbon atoms or a saturated hydrocarbon group interrupted by ether oxygen atoms containing 3 to 10 carbon atoms; and
   (c) 0 to 3 weight percent of at least one crosslinking agent for acrylate or methacrylate resins.

2. A binder according to claim 1 wherein the epoxy resin has a molecular weight of 1300 to 1450 and an epoxide equivalent weight between 750 and 1000.

3. A binder according to claim 2 wherein (A) (b) is an alkanoic acid having an average of 10 to 14 carbon atoms.

4. A binder according to claim 3 wherein (A) (a) consists of methacrylic acid.

5. A binder according to claim 4 wherein (A) (b) is lauric acid, (B) (b) is 2-ethylhexyl acrylate and (B) (c) is 0 weight percent.

6. A binder according to claim 3 wherein (B) (b) is n-butyl acrylate, n-butyl methacrylate, 2-ethylhexyl acrylate, 2-hydroxypropyl methacrylate, 2-ethoxyethyl acrylate, 2-ethoxyethyl methacrylate or ethyl triethylene glycol methacrylate and (B) (c) is 0 weight percent.

7. A composition according to claim 1 wherein over 50% of (A) (a) is methacrylic acid.

8. A composition according to claim 7 wherein (A) (b) is an alkanoic acid having 8 to 20 carbon atoms.

9. A composition according to claim 1 wherein (A) (b) is an alkanoic acid having 8 to 20 carbon atoms or a mixture of such an alkanoic acid with up to 20 mole percent of an alkenoic acid having 8 to 20 carbon atoms or a hydroxy alkenoic acid having 8 to 20 carbon atoms.

10. A binder according to claim 1 which is room temperature curable.

11. A road having on the surface thereof a road marking comprising the binder of claim 1.

12. A road according to claim 11 wherein the marking has a thickness of 0.5 to 3 mm.

13. A road according to claim 11 wherein the marking has a thickness of 0.5 to 1.5 mm.

14. A road according to claim 11 wherein the marking has a thickness of 2 to 3 mm.

15. A road according to claim 11 which is an asphalt or concrete road.

16. A road according to claim 15 wherein the marking has a thickness of 0.5 to 3 mm.

17. A road marking composition comprising the binder of claim 1 and a pigment.

18. A road marking composition according to claim 17 including reflecting beads.

* * * * *